(12) United States Patent
Van Belle et al.

(10) Patent No.: US 7,953,804 B2
(45) Date of Patent: May 31, 2011

(54) USER INTERFACE FOR A HANDHELD DEVICE

(75) Inventors: Theodore Van Belle, Waterloo (CA); Scotte Zinn, Waterloo (CA); Andrew Bocking, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 672 days.

(21) Appl. No.: 11/421,832

(22) Filed: Jun. 2, 2006

(65) Prior Publication Data
US 2007/0283044 A1    Dec. 6, 2007

(51) Int. Cl.
*G06F 15/16* (2006.01)
(52) U.S. Cl. ........ 709/206; 709/203; 709/204; 709/207; 709/231
(58) Field of Classification Search .................. 709/206, 709/204, 201, 203, 230; 707/1, 6; 715/231, 715/739, 745
See application file for complete search history.

(56) References Cited

U.S. PATENT DOCUMENTS

| 6,788,319 | B2* | 9/2004 | Matsumoto et al. | 715/841 |
| 6,829,607 | B1* | 12/2004 | Tafoya et al. | 1/1 |
| 6,867,763 | B2 | 3/2005 | Griffin et al. | |
| 7,181,497 | B1* | 2/2007 | Appelman et al. | 709/206 |
| 2004/0181580 | A1 | 9/2004 | Baranshamaje | |
| 2005/0198144 | A1* | 9/2005 | Kraenzel et al. | 709/206 |
| 2005/0198180 | A1 | 9/2005 | Khanolkar et al. | |
| 2006/0004843 | A1* | 1/2006 | Tafoya et al. | 707/102 |
| 2006/0213968 | A1* | 9/2006 | Guest et al. | 235/375 |
| 2006/0242109 | A1* | 10/2006 | Pereira et al. | 707/1 |
| 2007/0011155 | A1* | 1/2007 | Sarkar | 707/5 |
| 2007/0124272 | A1* | 5/2007 | DeCastra et al. | 707/1 |
| 2009/0036106 | A1* | 2/2009 | Guest et al. | 455/414.1 |

OTHER PUBLICATIONS

"Installation and User's Guide—iPAQ BlackBerry H1100 Handheld", Aug. 21, 2000,Research in Motion Limited, Canada, cover page, second page, pp. 25, 29, and 131-133.
"Installation and User's Guide—iPAQ BlackBerry H1100 Handheld", Aug. 21, 2000,Research in Motion Limited, Canada, cover page, pp. 2-217.

* cited by examiner

*Primary Examiner* — Djenane M Bayard (57) ABSTRACT

A user interface and method for composing a message to be sent over a wireless network environment using a handheld device is disclosed. According to the method, upon receipt of a user request to compose a message, a screen is displayed with an input recipient field for a recipient address, an associated label to indicate that the input recipient field is for a recipient address, and an input message body field for holding message content. The method further includes, upon each keystroke entry of text to the input recipient field, looking up entries from an address book which match the text, and displaying a selection menu representing addresses from at least a portion of the entries.

20 Claims, 8 Drawing Sheets

USER INTERFACE FOR A HANDHELD DEVICE

FIELD OF THE INVENTION

The present patent document relates generally to user interface design and more particularly to the design of user interfaces for applications running on handheld communication devices.

BACKGROUND OF THE INVENTION

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyright rights whatsoever.

Handheld devices such as Personal Digital Assistants (PDAs), cellular phones, portable computing devices and other two-way data and/or voice communication devices, are increasing in popularity as they have become more feature-rich at an ever decreasing cost to the consumer. In particular, handheld devices that allow both voice and data communication are almost indispensable tools in certain businesses and government agencies. The need to maintain electronic mail communication as well as a variety of related information management applications such as electronic calendars, contacts and address books, without impeding mobility are among the critical factors driving the demand for handheld communication devices. Popular handheld devices include those supplied by Research In Motion Ltd. of Waterloo, Ontario, Canada.

However, some applications running on handheld devices may be cumbersome to use. This is partly due to the limitations of the hardware although user interface design also plays a part. Handheld devices must, by definition, be easily portable and convenient to carry around. This entails that the handheld devices must have a small form factor and a light enough weight for mobile use. Unfortunately, the small size of a mobile handheld device limits the available physical means for data entry, data output and general interaction with a user. Both the data entry pad or keyboard and viewable screen size of a handheld device are necessarily small compared with personal computers or workstations. Moreover, the use of a peripheral input device such as a mouse is awkward or impractical for handheld devices, as the peripheral is often almost as large as the handheld itself. In addition, handheld devices are often battery operated. Battery operated devices must pay particular attention to power consumption as power is a very limited resource. It is thus advantageous, for power conservation purposes, to minimize the number of components that consume power.

Therefore it is often challenging for applications running on handheld devices, to offer user interface features that are as rich and as convenient to use as those offered by their counterparts running on PCs and workstations. PCs have much larger screens, bigger keyboards and may easily use additional peripheral input devices such as a mouse. Conventional applications running on handheld devices thus typically offer user interfaces that are less familiar and may sometimes be confusing to use. Approaches to solve user interface problems have tended to focus on the design of small form-factor keyboard layouts for optimal thumb-based data entry, such as the solution taught by U.S. Pat. No. 6,867,763 granted to Research In Motion Ltd.

However, the visual aspects of data entry interfaces in handheld devices for common applications such as email client software, still tend to be different from those offered by the desktop equivalents, due primarily to the limitations of screen size. These differences in the user interfaces, between handheld versions and desktop versions of similar applications such as email clients are disadvantageous. The typical handheld user is almost always familiar with a desktop email client that offers a more convenient user interface; and is therefore likely to be inconvenienced by a user interface that is very different. Composing an email message using conventional email clients on handhelds, for instance, often entails an excessive use of menu driven input. Accordingly, there is a need for applications running on handheld devices that mimic some of the desirable aspects of user interfaces of corresponding desktop applications. Advantageously, a better user interface would make handheld devices more convenient and enjoyable to use.

BRIEF DESCRIPTION OF THE DRAWINGS

Aspects and features of the disclosed device and method will become apparent to those of ordinary skill in the art upon review of the following description of specific embodiments in conjunction with the accompanying figures. In the figures which illustrate by way of example only, the embodiments.

DETAILED DESCRIPTION

A handheld device and method for composing an email message to be sent over a wireless network environment is disclosed. In accordance with one aspect, a method of operation of a handheld device is disclosed. According to the method, upon receipt of a user request to compose an e-mail, a screen is displayed with an input recipient field for a recipient address, an associated label to indicate that the input recipient field is for a recipient address, and an input message body field for holding message content. The method further includes, upon each keystroke entry of text to the input recipient field, looking up entries from an address book which match the text, and displaying a selection menu representing addresses from at least a portion of the entries. In accordance with another aspect, a handheld device loaded with an email client is disclosed. The email client includes processor executable instructions that allow a user to compose an email message to send to a server computer over a network. The email client on the handheld device displays a screen with an input recipient field for a recipient address, an associated label to indicate that the input recipient field is for a recipient address, and an input message body field for holding message content. The device further looks up entries from an address book which match text typed into the input recipient field, and displays a selection menu representing addresses from at least a portion of the entries.

Figure 1:
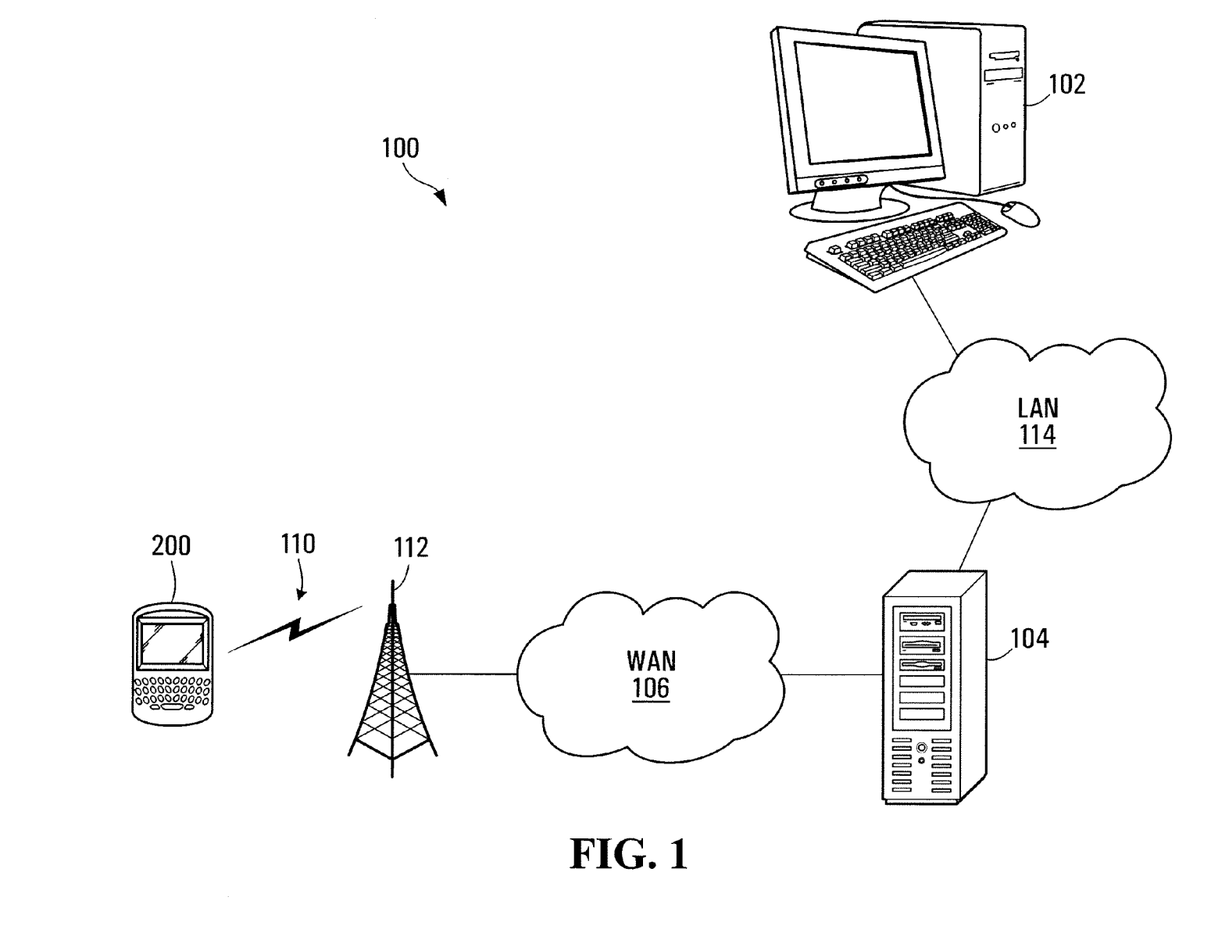
FIG. 1 is a schematic diagram depicting a typical networked environment in which a handheld computing device may be used.

FIG. 1 shows a schematic diagram depicting a typical networked environment 100 in which a handheld computing device 200 may be used. Networked environment 100 may include a desktop computing device 102, a server computer 104, a wide area network (WAN) 106, a communications network 110 and exemplary handheld device 200. Server 104 may include email server software, and may be interconnected with a desktop computer 102 through a local area network (LAN) 114. Server 104 may additionally include software that facilitates access to the email server software by handheld device 200.

A radio frequency (RF) base station 112 may provide a communication link between WAN 106, which may be the public Internet, and a communications network 110, which may be a wireless network. Handheld device 200 may access data from server 104 or desktop computer 102 through the communications network 110 and WAN 106. In some network architectures, a firewall may be implemented between WAN 106 and server computer 104 to gate access to LAN, 114 which may be a corporate LAN.

Handheld device 200 may be loaded with email client software that accesses email messages, stored in mail server software such as Microsoft Exchange or Lotus Domino software, running on server 104. To facilitate data access by handheld device 200, server 104 may be loaded with specialized software to provide compression, encryption and a data interface with the mail server software.

Figure 2:
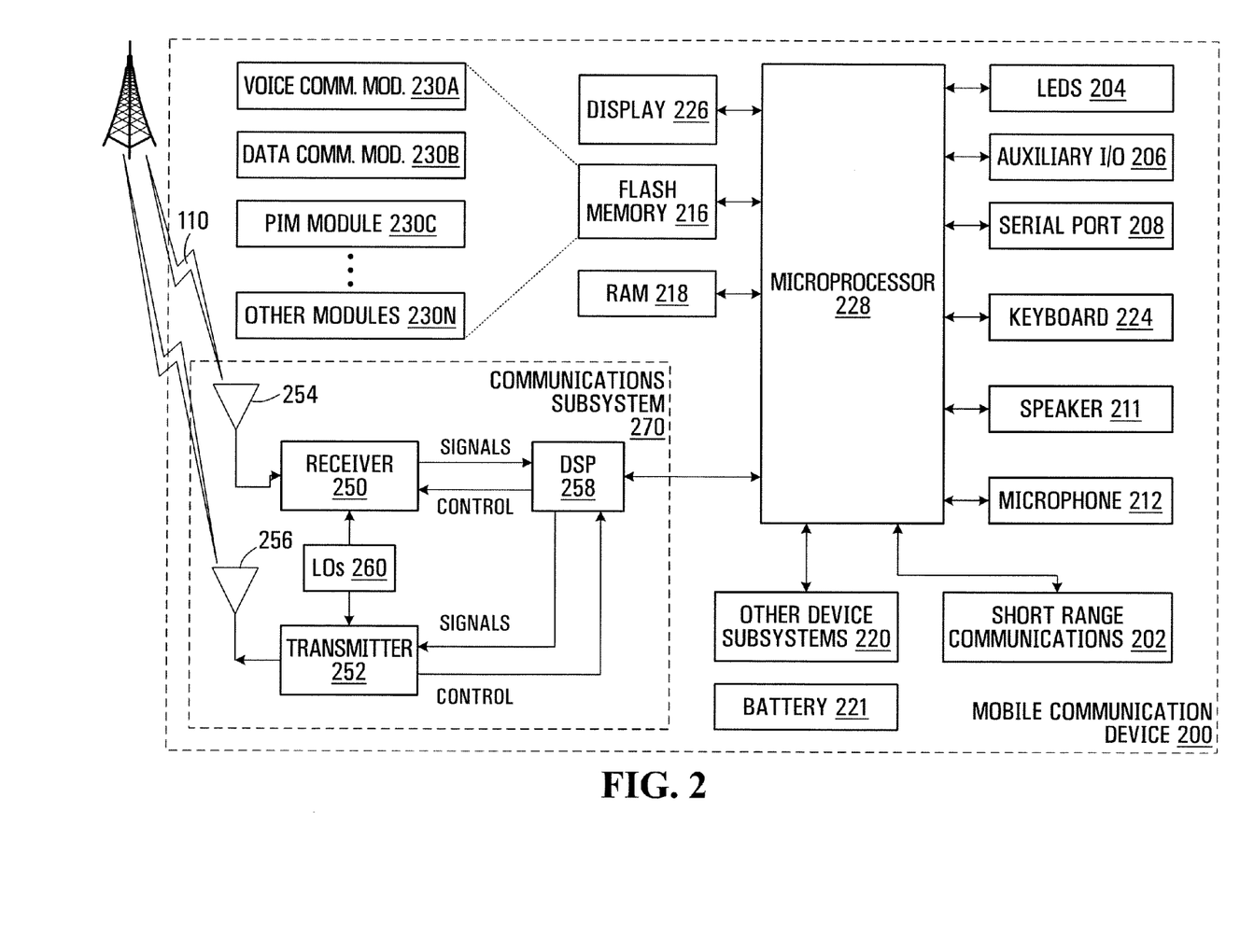
FIG. 2 is a block diagram of the various components of conventional handheld device 200 of FIG. 1.

FIG. 2 is a schematic diagram of exemplary handheld mobile communication device 200. Device 200 may include a housing, an input device (keyboard 214), and an output device (display 226), which may be a full graphic Liquid Crystal Display (LCD). Other types of output devices may alternatively be utilized. A processing device (microprocessor 228) is shown schematically in FIG. 2 as coupled between the keyboard 214 and the display 226. The microprocessor 228 controls the operation of the display 226, as well as the overall operation of the handheld device 200, in response to actuation of keys on the keyboard 214 by a user.

The housing may be elongated vertically, or may take on other sizes and shapes (including clamshell housing structures). The keyboard may include a mode selection key, or other hardware or software for switching between text entry and telephony entry.

In addition to the microprocessor 228, other parts of the handheld device 200 are shown schematically in FIG. 2. These include: a communications subsystem 270; a short-range communications subsystem 202; the keyboard 214 and the display 226, along with other input/output devices including a set of auxiliary I/O devices 206, a serial port 208, a speaker 211 and a microphone 212; as well as memory devices including a flash memory 216 and a random access memory (RAM) 218; and various other device subsystems 220. The handheld device 200 may have a battery 221 to power the active elements of the handheld device 200. The handheld device 200 is preferably a two-way radio frequency (RF) communication device having voice and/or data communication capabilities. In addition, the handheld device 200 may have the capability to communicate with other computer systems via the Internet.

Operating system software executed by the microprocessor 228 is preferably stored in a persistent store, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the handheld device may also be stored to the RAM 218.

The microprocessor 228, in addition to its operating system functions, enables execution of software applications on the handheld device 200. A predetermined set of software applications that control basic device operations, such as a voice communications module 230A and a data communications module 230B, may be installed on the handheld device 200 during manufacture. The data communications module 230B can allow the handling of email messages. In addition, a personal information manager (PIM) application module 230C may also be installed on the handheld device 200 during manufacture. The PIM application is preferably capable of organizing and managing data items, such as e-mail, calendar events, voice mails, appointments, and task items. The PIM application is also preferably capable of sending and receiving data items via a wireless network 110. Preferably, the data items managed by the PIM application are seamlessly integrated, synchronized and updated via the wireless network with the device user's corresponding data items stored or associated with a host computer system. As well, additional software modules, illustrated as other software modules 230N, may be installed during manufacture.

Communication functions, including data and voice communications, are performed through the communication subsystem 270, and possibly through the short-range communications subsystem 202. The communication subsystem 270 includes a receiver 250, a transmitter 252 and one or more antennas, illustrated as a receive antenna 254 and a transmit antenna 256. In addition, the communication subsystem 270 also includes a processing module, such as a digital signal processor (DSP) 258, and local oscillators (LOs) 260. The specific design and implementation of the communication subsystem 270 is dependent upon the communication network in which the handheld device 200 is intended to operate. For example, the communication subsystem 270 of the handheld device 200 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the handheld device 200.

Network access requirements vary depending upon the type of communication system. For example, in the Mobitex™ and DataTAC™ networks, handheld devices are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, the handheld device 200 may send and receive communication signals over the communication network 110. Signals received from the communication network 110 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the network 110 are processed (e.g., modulated and encoded) by the DSP 258 and are then provided to the transmitter 252 for digital to analog conversion, frequency up conversion, filtering, amplification and transmission to the communication network 110 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 270 and is input to the microprocessor 228. The received signal is then further processed by the microprocessor 228 for an output to the display 216, or alternatively to some other auxiliary I/O devices 206. A device user may also compose data items, such as e-mail messages, using the keyboard 214 and/or some other auxiliary I/O device 206, such as a touchpad, a rocker switch, a thumb-wheel (track-wheel), or some other type of input device. The composed data items may then be transmitted over the communication network 110 via the communication subsystem 270.

In a voice communication mode, overall operation of the device is substantially similar to the data communication mode, except that received signals are output to a speaker 211, and signals for transmission are generated by a microphone 212. Alternative voice or audio I/O subsystems, such as a voice message recording subsystem, may also be implemented on the device 200. In addition, the display 226 may also be utilized in voice communication mode, for example, to display the identity of a calling party, the duration of a voice call, or other voice call related information.

The short-range communications subsystem 202 enables communication between the handheld device 200 and other proximate systems or devices, which need not necessarily be similar devices. For example, the short-range communications subsystem may include an infrared device and associated circuits and components, or a Bluetooth™ communication module to provide for communication with similarly-enabled systems and devices.

Handheld device 200, when operating under the control of known software and device code (firmware), may be used to compose an electronic mail message to a recipient in the manner illustrated in FIGS. 3A-3D. Variations in the sequence of actions, such as the use of keyboard keys instead of the track-wheel 206, or the optional use of popup menus to alter the sequence of user interface screens, are possible.

Figure 3A:
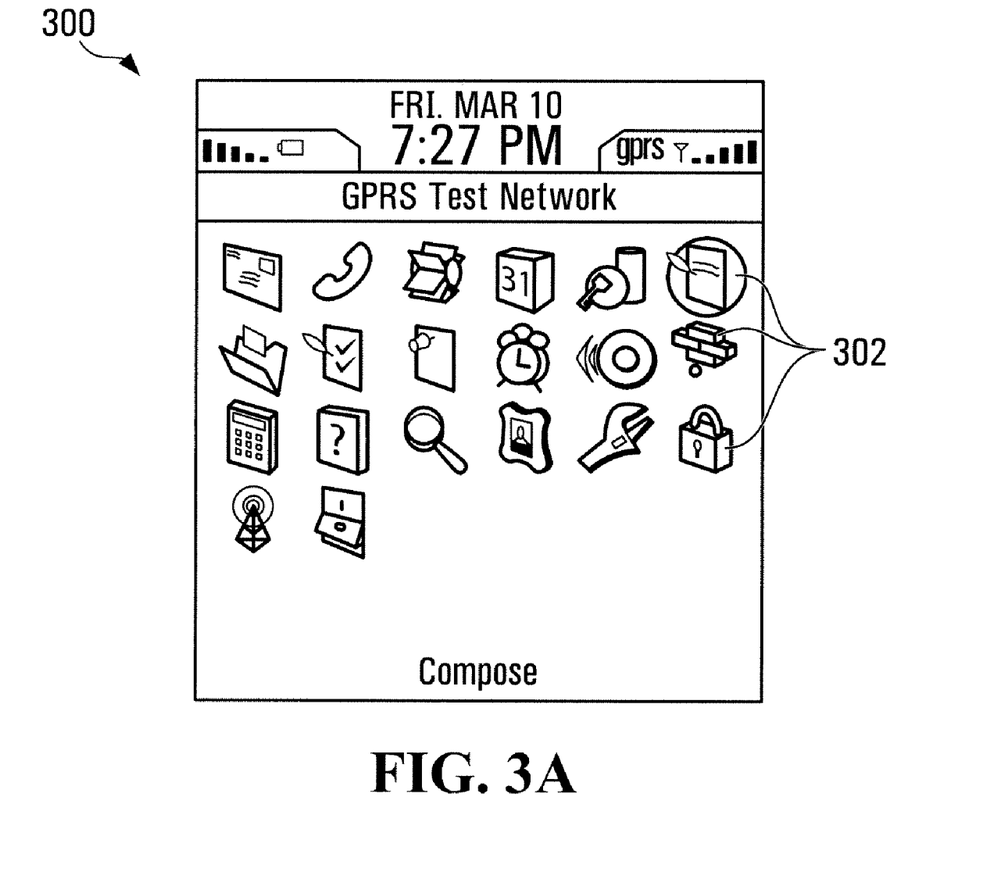
FIGS. 3A-3D are block diagrams of screenshots of the user interface of an exemplary email client executing on the handheld device of FIG. 2 in a conventional manner.
Figure 3B:
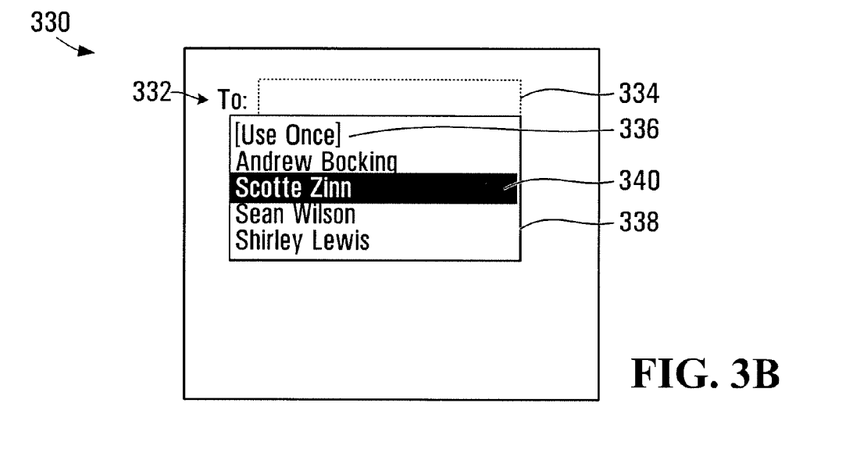

With reference to FIGS. 3A-3D along with FIG. 2, startup screen 300 (FIG. 3A) of a known email application running on the handheld device 200, may include icons 302 which may be allocated labels, for example, 'Messages', 'Address book', 'Calendar', 'Compose', 'Browser' etc. Each of these icons 302 typically launch new, appropriately tailored user interface screens on the display 226 when selected by the user by way of the track-wheel 206 or the keyboard 214. FIG. 3B depicts an exemplary screenshot of a user interface screen, displayed by a known handheld email client when the 'Compose' icon is selected in FIG. 3A. The depicted user interface 330 includes a label 332, an input field 334, a drop down address selection list 338, headed with a '[Use Once]' selection 336. One of the addresses may be highlighted as shown at email address selection 340. Label 332 may read 'To:' in an English version of the software. All labels may of course contain translated equivalents of the exemplary English labels illustrated, as needed.

The address selection list is a list of the first entries in the local address book stored in handheld device 200 headed with a '[Use Once]' entry. If the address book is empty or the intended recipient's address is not in the address book, only the '[Use Once]' option and a message line that reads '*No Addresses*' is displayed indicating that the address book is empty. The message line itself may be selectable and if selected it may prompt for a new address using a new email address entry window (not shown).

Figure 3C:
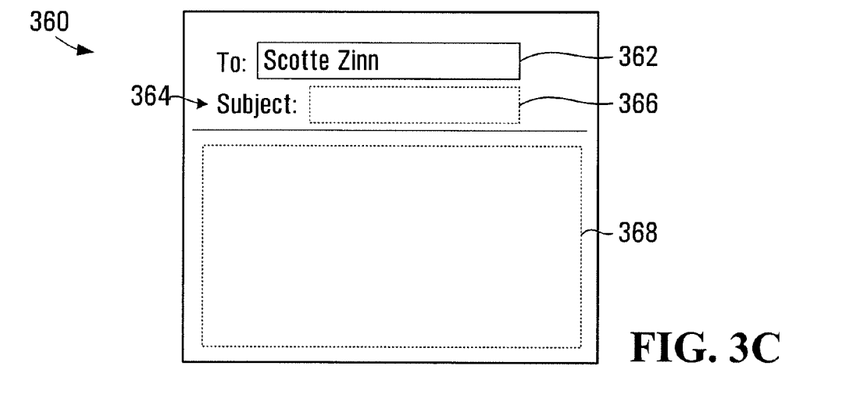

If the address book is not empty the user may select the entry 340 with the name of a recipient in the address list 338 as shown in FIG. 3B. Upon selecting a recipient, a popup menu (not shown) with a pre-selected entry that reads "email selected_name" may be presented (where selected_name simply signifies the name of the selected email recipient—e.g. Scotte Zinn). Once the pre-selected (highlighted) popup menu entry is selected, the screenshot 360 as depicted in FIG. 3C may be launched. Screenshot 360 includes an un-editable field 362 containing the selected recipient. A popup menu (not shown in FIG. 3C) may be invoked by way of track-wheel 206 with entries labeled as 'Add To:', 'Add Cc:', 'Add Bcc:' and 'Delete Field'. Screenshot 360 also typically includes label 336 which reads "Subject:" and fields 366 and 364 which are freeform fields for use to enter the subject and contents of the email being composed respectively.

Figure 3D:
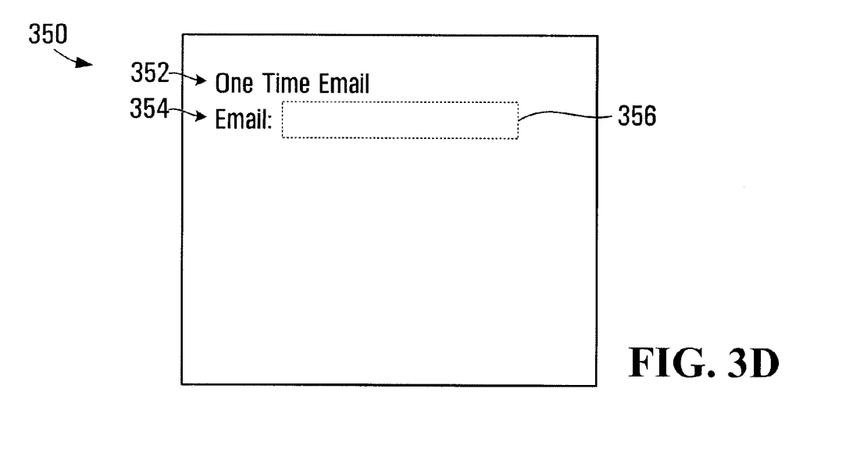

However, if the '[Use Once]' entry 336 is selected using track-wheel 206 or the 'enter' key on keyboard 214 (while the '[Use Once]' entry 336 is highlighted), screenshot 350 shown in FIG. 3D is displayed. A message label 352 indicates 'One Time Email' or a similar phrase, while label 354 reads "Email:" and field 356 is freeform to allow typing of the recipient. Label 352 is intended to indicate to the user that the current email is for use on a one-time basis and not retrieved from the address book. After entering the email address in field 354 and pressing the enter key (or equivalently pressing the track-wheel), the screenshot 360 depicted in FIG. 3C appears.

It can be easily appreciated that the sequence of actions to arrive at screenshot 360 is not very intuitive or as straightforward as possible. In that regard, new users who have not synchronized their local address book in their handheld device 200 will have to undertake the steps represented by the sequence of user interfaces shown in FIGS. 3A-3D. Whether or not the recipient is found in the address book, the steps required to send an email using known email clients is inconsistent with the way email is composed using popular desktop email client applications such as Outlook) from Microsoft Corp. of Redmond, Wash., USA. For example, it may not be quite clear what '[Use Once]' (in FIG. 3B) means to one who is not already well versed in the use of the handheld device executing a conventional email client. Also, the number of menu accesses to navigate through to screenshot 360 can be considerable. It is therefore likely that the user interfaces depicted in FIGS. 3B-3D may be sources of confusion and frustration to users, especially novice users.

As mentioned earlier, the sequence of user interaction described thus far results from handheld device 200 operating with known software. Several variations exist consequent upon different known software loads. However, these variations nonetheless exhibit at least some of the disadvantageous characteristics identified.

One approach to solve the user interface problems identified is to have the handheld device mimic, to the extent possible, standard user interfaces used in popular desktop applications. Conveniently, handheld device 200 may be adapted to operate in exemplary inventive manners by the way of new software loaded onto device 200.

Figure 4:
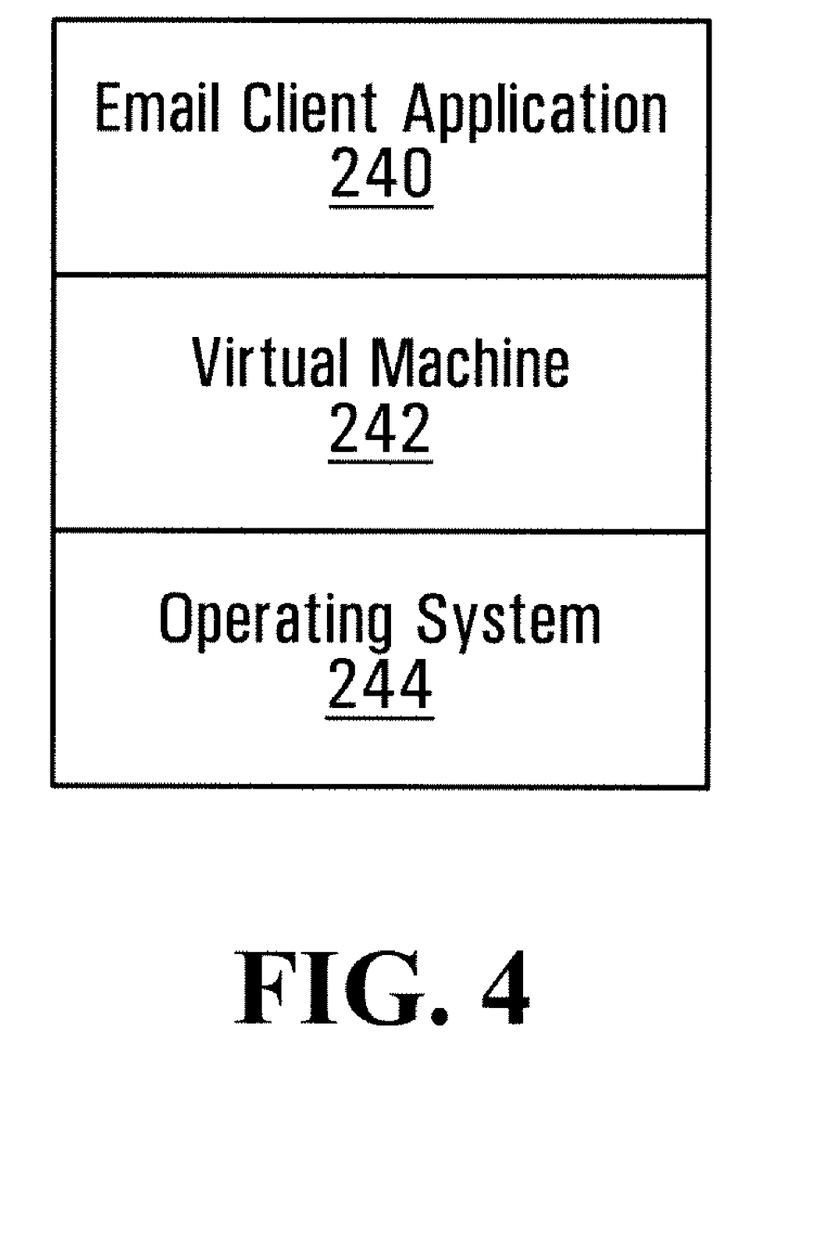
FIG. 4 depicts an exemplary software architectural layers for an email client executing on the handheld device 200 of FIG. 2 in accordance with one exemplary embodiment.

In this regard, returning to FIG. 2, the microprocessor 218 in handheld device 200 may be used to run software applications comprising processor executable instructions. Microprocessor 228 interacting with RAM 218 and other device subsystems, may execute operating system software and other applications which may be stored in a persistent store such as flash memory 216. In addition, applications may be loaded onto handheld device 200 from an external source accessible through auxiliary I/O 206, serial port 208, short range communications subsystem 202 or other device subsystems 220, for execution by microprocessor 228. As depicted in FIG. 4, software applications 240 such as an email client, electronic calendar, or appointment organizers may execute inside a virtual machine 242 running atop an operation system 244. An exemplary virtual machine may be the K virtual machine (KVM) from Sun Microsystems Inc. of Santa Clara, Calif., USA. The applications 240 may have the ability to send and/or receive data, via the network 110.

Software applications 240, such as applications according to embodiments of this disclosure may easily be implemented using a standard programming language such as the Java™ programming language, targeting a virtual machine executing in handheld device 200. To make use of a virtual machine, an application development platform, such as the Java 2 Micro Edition (J2ME), along with a development environment which may be a variant of the Java Development Environment (JDE) from Sun Microsystems Inc., may be used to develop applications. Application developer guides for a specific development platform may be consulted to develop an application with user interfaces as disclosed herein. JDE for a particular handheld device, for example, provides a set of application programming interfaces (API) which provides access to device features including user interface, networking, localization and other capabilities. Thus, using the above resources and related hardware, software and documentation, the descriptions of embodiments of the user interface layouts provided hereinafter and associated features can be implemented in a straightforward manner by those with ordinary skill in the art. Alternately, many other programming approaches, languages and platforms may be used. For instance, the application may target the operating system of device 200 directly, or another programming language such as C or C++ may be used. The approach outlined above is thus only exemplary and in no way limiting.

A handheld device 200 operated in exemplary inventive manners may start out by launching a start up screen similar to that in FIG. 3A, and displaying icons 302 which may be labeled as 'Messages', 'Address book', 'Calendar', 'Browser' etc. Icons 302 allow the user to launch new user interface screen on display 226 when selected by track-wheel 206 or keyboard 214.

Figure 5A:
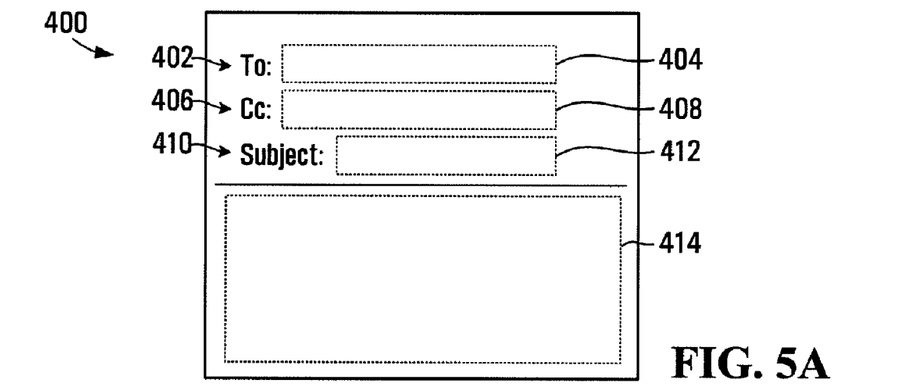
FIGS. 5A-5F are block diagrams representative of screenshots of the user interface presented to a user when executing an exemplary email client software in an exemplary embodiment of the handheld device of FIG. 2.

Screenshots of handheld device 200 when loaded with software so as to operate in accordance with the present disclosure are depicted in FIGS. 5A-5F. FIG. 5A depicts a schematic diagram of an exemplary screenshot 400 of a handheld device 200 executing a client application, launched after a selection to compose email, is made in a startup screen. Screenshot 400 may be launched for example by selecting a 'Messages' icon first and then selecting a 'Compose Email' entry in a popup menu (not shown). Alternatively, a 'Compose' icon may be present in the startup screen that launches screenshot 400 upon selection. Other ways of launching screenshot 400 starting from the startup screen may be included as needed in an exemplary inventive application executing on device 200.

Screenshot 400 is an exemplary email composition screen. Screenshot 400 may include labels 402, 406 and 410 which may read "To:", "Cc:" and "Subject:", respectively. Input recipient field 404 is a freeform field in which a recipient may be entered. Field 408 is a freeform field in which copied recipients are entered. Field 412 is a form field in which the subject heading for the email may be entered while field 414 allows the message content of the email to be keyed in.

Figure 5B:
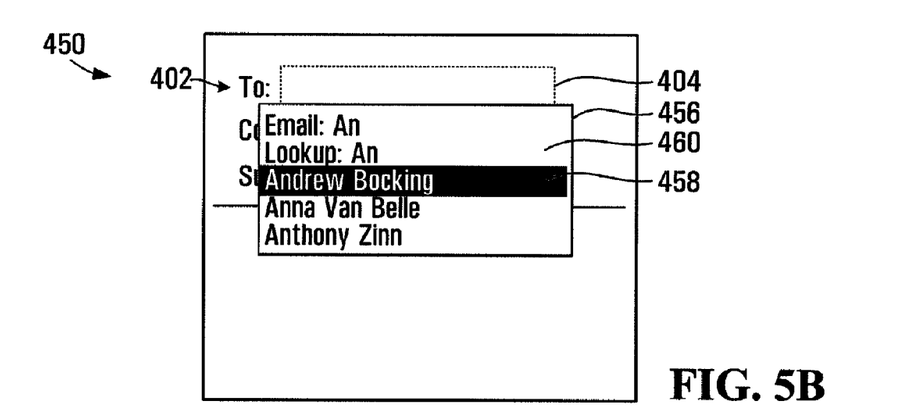

As the user types text in to field 404, any matching names may be selected from the address book and displayed in a selection menu 456 as shown in FIG. 5B. (For reasons which will be explained, the menu 456 may be headed with the entries 'Email' and 'Lookup'.) The menu may allow a user to move down to one of the listed addresses and select an entry. Selection menu 456 may be dynamically updated upon each keystroke entry of text into input recipient field 404, by displaying in the selection menu 456 a filtered list of names, so that only names containing the typed text (in field 404) are displayed. As shown in FIG. 5B only names matching 'An' are listed in selection menu 456, as a result of the user typing 'An' into input recipient field 404. Menu 456 may occupy as much vertical space below the field 404 as allowable. Moreover, the screen may scroll to allow at least two screens of menu 456.

As the user types in more letters the list of matching names may become shorter, since names that do not match the typed text are successively removed from selection menu 456 with each keystroke entry of text into field 404. If the user selects an entry in selection menu 456, the selected entry will be inserted into field 404, field 404 is changed to become a non-freeform field, and the selection menu 456 disappears. If the selected entry contains no email address, a warning may be displayed indicating that the entry does not contain an email address. Conversely, if the selected entry contains multiple email addresses, a dialog or menu (not shown) may be displayed with a list of possible email addresses for the recipient, to allow the user to select one.

In one embodiment, if an escape key is pressed, while the selection menu 456 has focus, the menu disappears and field 404 receives focus again. In alternate embodiments the user may be able to close selection menu 456 by continuing to scroll up after the top item in selection menu 456 has received focus. In other embodiments, if a user changes an input field (e.g. field 404) while menu 456 is not visible, either by keystroke or using the track-wheel, then menu 456 may reappear.

Figure 5C:
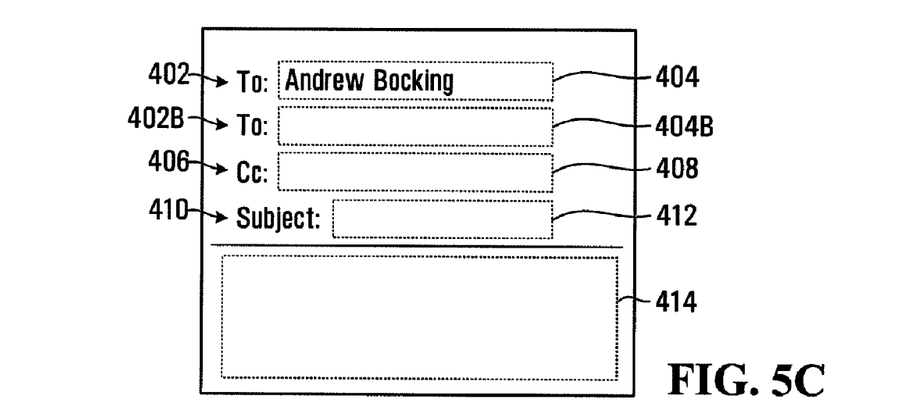

After an address is selected, and inserted into input recipient field 404, a new input field of the same type ('To:', 'Cc:' or 'Bcc:') may appear. For example, as shown in FIG. 5C, a new 'To:' label 402B and a second input recipient field 404B may appear after the initial 'To:' input recipient field 404 was populated with the selected recipient. When the email is sent, all blank input recipient fields may be automatically stripped out. Conversely, a second recipient may then be provided in the new 'To:' field 404B, in a manner similar to the way of the first recipient is specified. The user may change the focus to any desired input field (e.g. from the input recipient field 404B to the copy recipient field 408) using the track-wheel. At any time, the popup selection menu 470 of FIG. 5F may be invoked by way of the track-wheel to select one of the entries labeled as 'Add To:' 474, 'Add Cc:' 476, 'Add Bcc:' 478 or 'Delete Field' 480. As the labels suggest, new input fields may be added, so that the 'Add To:' entry 474 may be used to add a new email recipient; the 'Add Cc:' entry 476 may be used to add a copy email address; and the 'Add Bcc:' entry 478 is used to add a blind copy email address. To delete a field, the popup menu 470 may be invoked (by pressing the track-wheel) while focus is on a given input field. The 'Delete Field' entry 480 may then be selected to remove the unwanted input field.

Figure 5D:
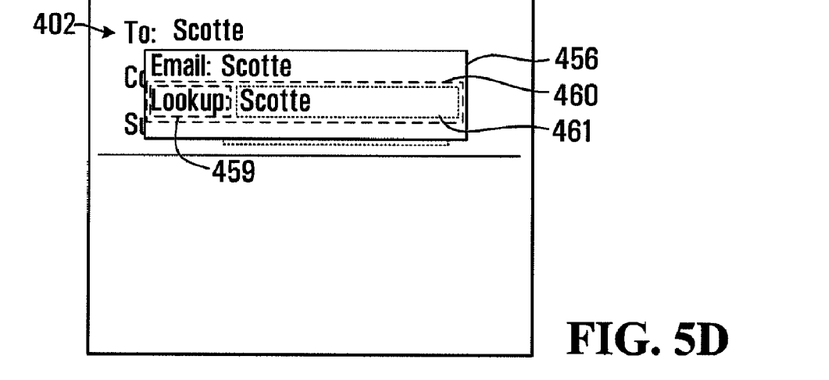

The possibility exists that the intended e-mail recipient is not in the address book but the user knows the e-mail address of the recipient. To facilitate entry of an e-mail address, as text characters are typed in input recipient field 404 or 404B (FIG. 5C), the contents may be translated in a special SMTP (simple mail transfer protocol) Email Translation Field that appears at the top of the selection menu. This character translation may work as follows. Letters and numbers remain unaltered. The first space character is translated into '@' and subsequent space characters are translated into periods. For instance the sequence of letters (inside the double quotes) "terry van belle" in this translation scheme, would be translated to 'terry@van.belle' (inside the single quotes) which results after replacing the first space by '@' and the subsequent space by a period, just as described above. As the first five letters, "terry" are entered, the SMTP email translation field at the top of selection menu 456 would read "terry", while selection menu 456 also displays address book entries matching the string "terry", if any. As the first space character is typed in, the SMTP email translation field may now read 'terry@' in accordance with the translation scheme just described. After the second space character is entered (i.e., "terry van"), the SMTP email translation field would read 'terry@van.' and entries in menu 456 that do not match "terry van" would disappear, although the SMTP email translation field and the 'Lookup:' entry would still be visible (FIG. 5D). As the rest of the string characters are keyed in, the translated field would finally read 'terry@van.belle'. Alternatively, the translated text could appear in the input recipient field, rather than in a separate SMTP translation field.

Figure 5E:
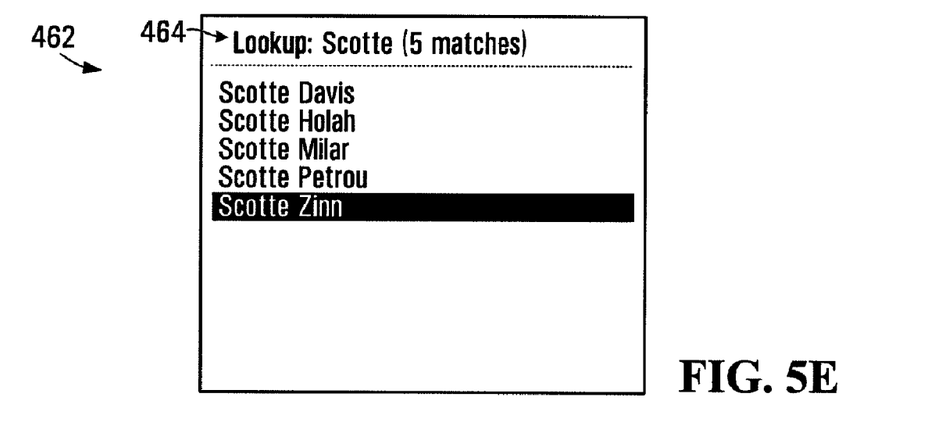
Figure 5F:
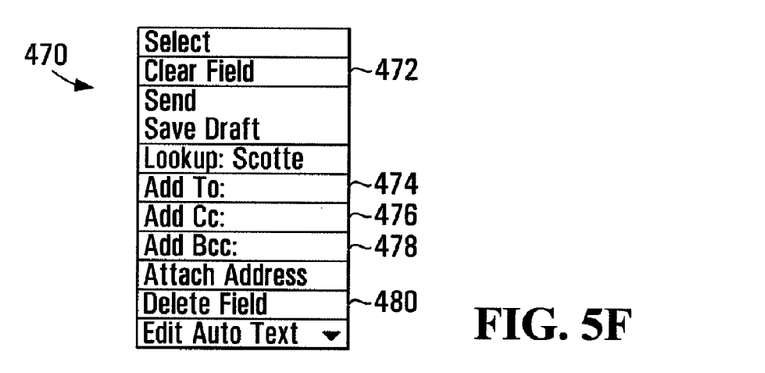

The email composition screen as shown in FIG. 5B and FIG. 5D may also allow a lookup in a global access list (GAL). The GAL is a list of recipients that resides in a remote computing device such as server 104 in FIG. 1. Thus, not all recipient email addresses need be stored in handheld device 200 as a GAL may be inspected by way of wired and/or wireless interconnections shown in FIG. 1. Specifically, the top of menu 456 may include 'Lookup:' entry 460 (FIG. 5D) with a label 459 a field 461 mirroring the current contents of field 404 (except that occurrences of '@' and '.' in the text of field 404 are replaced with spaces). From the menu 456, a user may select the 'Lookup' entry 460 to search the GAL residing in a remote server. Thus, although all matching address book entries (i.e., locally stored recipient names) would be listed in menu 456 as the user types text into field 404, the user may select, 'Lookup:' entry 460, to trigger a global address lookup. The string in field 461 may then be sent over network 110 to a server computer 106 using the communications subsystem 270, over network 110 as shown in FIG. 1. In server 106, recipients that match the received strings are selected from the global access list and transmitted back to the device 200, where they are received, processed and presented to the user as shown in FIG. 5E. If the strings are not found in the GAL, the list 462 should not appear but instead the field may read 'Lookup Failed: [keywords]', where [keywords] represents the contents of field 461.

An exemplary result of a remote or global address lookup is displayed in screenshot 462 in FIG. 5E. The title label 464 may read "Lookup: keywords (n matches)" or its equivalent, where n stands for the number of matches found in a remote address lookup. The title label thus indicates how many matches were found. If the search returns only one address, then in one embodiment, the returned address may automatically filled in to the appropriate recipient input field without displaying screenshot 462. In one embodiment, the lookup screen 462 may not be automatically displayed. Instead the input field may read 'Lookup: keywords (n matches)'. If the menu 456 is invoked while focus is in such a field, the menu may contain a 'View Lookup' entry. Selecting 'View Lookup' may then invoke screenshot 462. Once an entry is selected, screenshot 462 may disappear and the email composition screen may appear.

Figure 6:
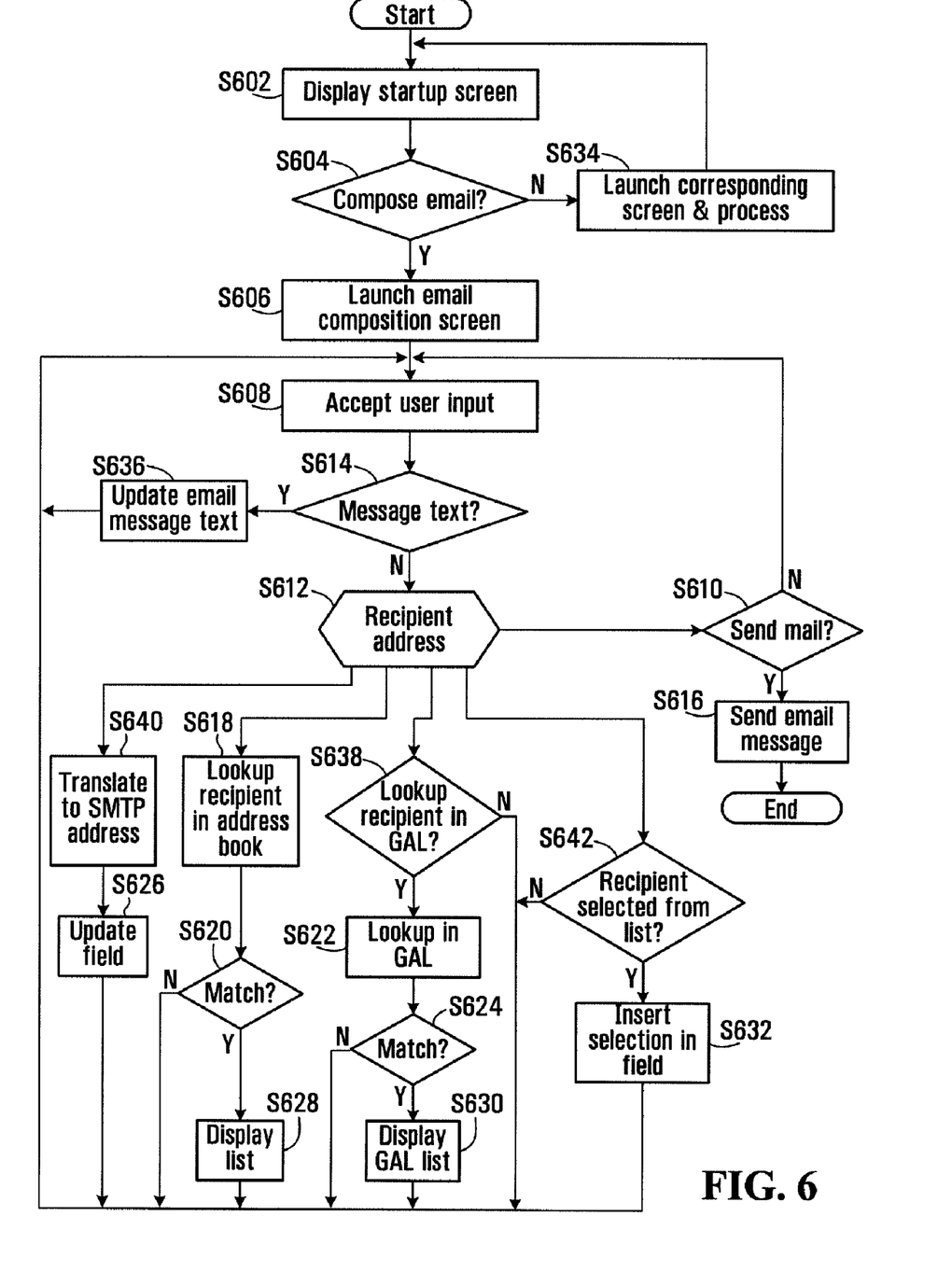
FIG. 6 is a flowchart that illustrates one exemplary operation of a handheld device executing an email client in accordance with exemplary embodiments as disclosed.

FIG. 6 shows a flow chart that summarizes the basic operations of one possible implementation of a handheld device executing an email client as presently disclosed. The flow chart S600 starts by displaying a startup screen which may be similar to the screenshot shown in FIG. 3A (S602). If the user decides to compose an email message (S604), the device launches an email composition screen (S606), and waits for a user input (S608). If the input is a message text (S614) then the email message field is updated (S636) and the process returns to waiting for user input (S608). If the input is an indication to send the composed email (S610) the email is sent to the specified recipients (S616). If the input is a recipient address (S612) then several processes take place. The text in the recipient input field is translated into an SMTP address (S640) and the corresponding field is updated (S626). Moreover, as soon as the recipient is partially specified, the partial text is used to search the address book for matches (S618, S620), which are displayed (S628). If the user elects to search the GAL (S638) using the 'Lookup' option, then the partial text is also searched in the GAL (S622). Matching recipients from the GAL (S624) are displayed to user (S630). If the user chooses a recipient from the displayed list of matching recipients (S642), then the chosen recipient is inserted into the appropriate input field (S632). As can be seen, control may be returned back to the user (to S608) from several steps (S636, S626, S620, S628, S624, S632, etc.) to permit flexible user interaction.

The described approach and user interfaces may also be used with messaging services other than e-mail such as Personal Identification Number (PIN) based addressing service, short messaging service (SMS), multimedia messaging service (MMS) or instant messaging (IM) service. Where handheld device 200 may operate using one or more of these services, the user may select a particular service to use.

For example, a handheld device 200 may have a personal identification number (PIN) associated with it and a service may exist to allow addressing messages with a PIN. When two such devices communicate using a PIN-based addressing service, one device may send a message using a recipient's PIN (instead of an email address). Using handheld device 200 operating according to an embodiment of the present disclosure, a user may arrive at a screen similar to screenshot 400 (FIG. 5A) by selecting the 'Messages' icon (FIG. 3A), invoking a popup selection menu (not shown), and selecting a 'Compose PIN' entry. The handheld device may now be said to be in 'PIN mode'. As described for email composition, when a user types in text to an input field such as field 404, matching name entries from the address book appear in a selection menu such as selection menu 456. After the user selects a name, the selected entry is displayed in the input field. If the selected recipient in selection menu does not have a PIN address, a message indicating this may be displayed to the user. It is also possible that the intended recipient is not in the address book but the user knows the PIN of the recipient. To facilitate entry of the PIN, as text characters are entered, the client software may perform validation of the characters entered into a PIN input field and eliminate invalid PIN characters. For example, valid PIN characters in one embodiment may only include numeric characters 0-9 and letters a-f and A-F.

In another embodiment, short messaging service (SMS) may be used to send a text message to a recipient. Here, instead of an email address or a PIN, a phone number is used to specify recipients. A phone number associated with an SMS-enabled device may be specified as a recipient directly or through selection of a name in the address book associated with a phone number. Again, using handheld device 200 a user may arrive at an SMS composition screen by selecting the 'Messages' icon (FIG. 3A), invoking a popup selection menu (not shown), and selecting a 'Compose SMS' entry. Of course, in an SMS composition screen, only the 'To:' label and corresponding field may be displayed, since 'Cc:' and 'Bcc:' labels or associated input fields are not supported by SMS. If the intended recipient is not in the address book, or no phone number is associated with the recipient, but the user knows the phone number of the recipient, the user may enter the phone number into the input field. As the user keys in a phone number, the client software may assist the user by performing validation as characters are entered into a phone number input field and eliminating invalid characters. For example, valid phone number characters in one embodiment may only include numeric characters 0-9.

In yet another embodiment, multimedia messaging service (MMS) may be used to send a text message and multimedia attachments to a recipient. Here, again, a phone number is used to specify recipients. A phone number associated with an MMS-enabled device may be specified as a recipient. Using handheld device 200 a user may arrive at an MMS composition screen by selecting the 'Messages' icon (FIG. 3A), invoking a popup selection menu (not shown), and selecting a 'Compose SMS' entry. As is the case for SMS, in an MMS composition screen, only the 'To:' label and corresponding field may be displayed, since 'Cc:' and 'Bcc:' labels or associated input fields are not supported by MMS. If the intended recipient is not in the address book the user may enter the phone number of the recipient directly into the input field. The client software may assist the user by performing validation as characters are entered into a phone number input field, and eliminating invalid characters. Similar to the case for SMS, valid phone number characters in one embodiment may be restricted to numeric characters 0-9.

In yet another embodiment, instant messaging (IM) may be used to send and receive text messages to a recipient in real time. Here, a buddy name is used to specify recipients and a buddy name from a contact list associated with an instant messaging service may be used to select a recipient. Using an instant messaging client on handheld device 200 a user may arrive at an instant messaging screen. Instant messaging requires the user to log into an IM server. Once logged in, the user may initiate two-way communication with another user (a buddy) who is also logged in to the IM server. Similar to what was described for email composition, when a user types in text to the input field, matching buddy name entries from the list of contacts that are online (buddy names), may appear in a selection menu similar to selection menu 456 allowing the user to select one. After the user selects a name, the selected entry may be displayed in a field, such as field 404, and the user may then send and receive messages in real time. Rather than selecting a name from a contact list (buddy list), the user has the option of keying in a known buddy name.

In alternate implementations of instant messaging, a buddy name may be associated with address book entries. Using an instant messaging client on handheld device 200 a user may arrive at an instant messaging screen. As described for email composition, when a user types in text to the input field 404, matching recipient names from the address book are displayed in selection menu 456 allowing the user to select one. After the user selects a name, the selected entry may be displayed in a field, such as field 404, and the user may send and receive messages in real time. However, if the selected entry does not have an associated buddy name, the user is warned. Once again, the user may have the option of keying in a known buddy name into a recipient input field.

As may be appreciated by an ordinary user of popular desktop applications, the layout of screenshot 400 shown in FIG. 5A is substantially the same as user interface layouts commonly used in popular desktop email clients. In particular, field 404 corresponding to label 402 (which reads "To:") and field 408 corresponding to label 406 (which reads "Cc:"), are now very intuitive to use, even for novice users working with a handheld device with no address book entries. Users may now simply type the address of the recipient in to the field 404 (or field 408) without first going through menu driven input sequences such as the dropdown list similar to 338 (in FIG. 3B). As a further advantage, the often confusing '[Use Once]' selection 336 (shown in FIG. 3B) is conveniently avoided altogether. The improved user interface thus allows for a more enjoyable user experience and a reduced learning curve for new users, which in turn may help drive demand for wireless communication devices and related services.

Of course, the above described embodiments are intended to be illustrative only and in no way limiting. The described embodiments are susceptible to many modifications of form, arrangement of parts, details and order of operation. The disclosed embodiments are rather intended to encompass all such modification within the scope, as defined by the claims.

What is claimed is:

1. A method of operating a wireless handheld device, comprising:
   upon receipt of a request to use a messaging service, displaying (i) an input recipient field for a recipient address, and (ii) a message composition field for holding message content;
   thereafter, upon each keystroke entry of text into said input recipient field, concurrently:
      looking up entries from an address book which match said text; and
      replacing a first space in text entered to said input recipient field with an "@" symbol and replacing a subsequent space in said text with a "." symbol to thereby represent said text as an email address; and
      displaying a selection menu comprising said email address and any entries from said address book which match said text.

2. The method of claim 1 further comprising:
   detecting selection of an item in said selection menu, said item comprising one of: an address book entry and said email address;
   filling said input recipient field with said email address, if said detecting detects selection of said email address; and
   filling said input recipient field with said address book entry, if said detecting detects selection of said address book entry.

3. The method of claim 2 further comprising ceasing to display said selection menu upon said selection of an item from said selection menu.

4. The method of claim 2 wherein said selection menu includes an entry the selection of which triggers a wirelessly transmitted query to lookup said text in a remotely residing global access list.

5. The method of claim 2 further comprising, upon said detecting selection of an item in said selection menu:
- displaying a second input recipient field for a second recipient address; and
- upon each keystroke entry of text to said second input recipient field, concurrently:
  - looking up entries from said address book which match text input to said second input recipient field; and
  - replacing a first space in text input to said second input recipient field with an "@" symbol and replacing a subsequent space in said text input to said second input recipient field with a "." symbol to thereby represent said text as a second email address; and
- displaying a second selection menu comprising said second email address and any from said address book which match said text input to said second input recipient field.

6. The method of claim 2 wherein said address book entry is a recipient name associated with an address according to a protocol of said messaging service.

7. The method of claim 2 wherein said address book entry is a recipient name and if said recipient name is not associated with an address according to a protocol of said messaging service, generating a warning.

8. The method of claim 1 wherein said messaging service is an e-mail service.

9. The method of claim 8 further comprising accepting input to specify a second input recipient field as a "To:" field, a "Cc:" field or a "Bcc:" field.

10. The method of claim 1 wherein said messaging service is a short messaging service.

11. The method of claim 1 wherein said messaging service is an instant messaging service.

12. The method of claim 1 wherein said messaging service is a personal identification number (PIN) messaging service.

13. The method of claim 1 wherein said messaging service is a multi-media messaging service.

14. The method of claim 1 wherein said displaying said selection menu comprises displaying such that one of said email address and one of said any entries, is selectable from said selection menu.

15. The method of claim 1 wherein said text entered into said input recipient field includes at least one space and wherein each address displayed in said selection menu comprises said text including said at least one space.

16. A handheld device comprising:
- a persistent store;
- a keyboard for text entry;
- a display;
- a controller operable to:
  - upon receipt of a request to use a messaging service, display (i) an input recipient field for a recipient address, and (ii) a message body composition field for holding message content;
  - thereafter, upon each keystroke entry of text to said input recipient field, concurrently:
    - look up entries from an address book which match said text; and
    - replace a first space in text entered to said input recipient field with an "@" symbol and replace a subsequent space in said text with a "." symbol to thereby represent said text as an email address; and
    - display a selection menu comprising said email address and any entries from said address book which match said text.

17. The device of claim 16 wherein said controller is further operable to:
- detect selection of an item in said selection menu, said item comprising one of: an address book entry and said email address;
- fill said input recipient field with said email address, if selection of said email address is detected; and
- fill said input recipient field with said address book entry, if selection of said address book entry is detected.

18. The device of claim 16 wherein said controller is further operable to:
- detect selection of an item from said selection menu, said item comprising one of: an address book entry and said email address;
- display a second input recipient field for a second recipient address and
- upon each keystroke entry of text to said second input recipient field, concurrently:
  - look up entries from said address book which match text input to said second input recipient field; and
  - replace a first space in text input to said second input recipient field with an "@" symbol and replace a subsequent space in said text input to said second input recipient field with a "." symbol to thereby represent said text as a second email address; and
  - display a second selection menu comprising said second email address and any entries from said address book which match said text input to said second input recipient field.

19. The device of claim 16 wherein said messaging service is an e-mail service and wherein said controller is further operable to accept input to specify a second input recipient field as a "To:" field, a "Cc:" field or a "Bcc:" field.

20. The handheld device of claim 16 wherein said text entered into said input recipient field includes at least one space and wherein each address displayed in said selection menu comprises said text including said at least one space.

* * * * *

UNITED STATES PATENT AND TRADEMARK OFFICE
CERTIFICATE OF CORRECTION

| | | |
|---|---|---|
| PATENT NO. | : 7,953,804 B2 | |
| APPLICATION NO. | : 11/421832 | |
| DATED | : May 31, 2011 | |
| INVENTOR(S) | : Theodore Van Belle et al. | |

It is certified that error appears in the above-identified patent and that said Letters Patent is hereby corrected as shown below:

Column 13,
Line 15, "any from said address book" should be changed to --any entries from said address book--.

Column 13,
Line 52, "(ii) a message body composition field" should be changed to --(ii) a message composition field--.

Column 14,
Line 27, "address and" should be changed to --address; and--.

Signed and Sealed this
Sixth Day of March, 2012

David J. Kappos
*Director of the United States Patent and Trademark Office*